(12) United States Patent
Herbeck et al.

(10) Patent No.: US 7,958,215 B2
(45) Date of Patent: Jun. 7, 2011

(54) SYSTEM MANAGEMENT USING REAL TIME COLLABORATION

(75) Inventors: David Gerard Herbeck, Rochester, MN (US); Susette Marie Townsend, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 2104 days.

(21) Appl. No.: 10/365,298

(22) Filed: Feb. 12, 2003

(65) Prior Publication Data

US 2004/0158629 A1    Aug. 12, 2004

(51) Int. Cl.
    *G06F 15/173* (2006.01)
(52) U.S. Cl. ........ 709/223; 709/224; 709/226; 709/227; 379/265.01; 379/265.02
(58) Field of Classification Search .................. 709/222, 709/224, 206, 219, 223; 379/265.01, 265.02
    See application file for complete search history.

(56) References Cited

U.S. PATENT DOCUMENTS

| | | | | |
|---|---|---|---|---|
| 5,563,805 A * | 10/1996 | Arbuckle et al. | ............. | 709/204 |
| 5,815,554 A * | 9/1998 | Burgess et al. | ............. | 379/90.01 |
| 6,064,304 A * | 5/2000 | Arrowsmith et al. | ......... | 709/224 |
| 6,128,646 A * | 10/2000 | Miloslavsky | ................ | 709/206 |
| 6,223,165 B1 * | 4/2001 | Lauffer | ............................. | 705/1 |
| 6,327,677 B1 * | 12/2001 | Garg et al. | .................... | 709/224 |
| 6,430,602 B1 | 8/2002 | Kay et al. | ....................... | 709/206 |
| 6,449,344 B1 | 9/2002 | Goldfinger et al. | ........ | 379/88.17 |
| 6,513,013 B1 * | 1/2003 | Stephanou | ........................ | 705/1 |
| 6,535,492 B2 * | 3/2003 | Shtivelman | .................... | 370/270 |
| 6,631,412 B1 * | 10/2003 | Glasser et al. | ................. | 709/224 |
| 6,640,153 B2 * | 10/2003 | Kwak | ............................. | 700/138 |
| 6,829,585 B1 * | 12/2004 | Grewal et al. | ................. | 709/223 |
| 6,832,341 B1 * | 12/2004 | Vijayan | ........................... | 709/224 |
| 6,868,074 B1 * | 3/2005 | Hanson | ........................ | 709/219 |
| 7,024,548 B1 * | 4/2006 | O'Toole, Jr. | ................... | 709/222 |
| 7,072,966 B1 * | 7/2006 | Benjamin et al. | ............. | 709/228 |
| 7,120,647 B2 * | 10/2006 | Venkatesh et al. | ......... | 707/104.1 |
| 7,139,390 B2 * | 11/2006 | Brown et al. | ............. | 379/265.02 |
| 2002/0006191 A1 * | 1/2002 | Weiss | ........................ | 379/265.01 |
| 2003/0031309 A1 * | 2/2003 | Rupe et al. | ............... | 379/265.02 |
| 2004/0005048 A1 * | 1/2004 | Agusta | ...................... | 379/265.12 |

* cited by examiner

*Primary Examiner* — Ramy M Osman
(74) *Attorney, Agent, or Firm* — Grant A. Johnson

(57) ABSTRACT

The present invention provides a method of improving the response time to IT problems and ensuring that some will respond to a problem. In one embodiment, a management system uses a monitoring system to detect problem conditions with a managed device. When such an event occurs, the managed device sends a message containing a description of the alert to an intelligent agent. In response, the intelligent agent selects an administrator who is both qualified and available to respond to the alert, and then sends an instant message containing the description of the alert to the selected administrator. The administrator may accept responsibility for the alert by sending an instant message acknowledgement back to the intelligent agent. If the intelligent agent does not receive an acknowledgement, it automatically finds another administrator to respond to the alert.

17 Claims, 5 Drawing Sheets

SYSTEM MANAGEMENT USING REAL TIME COLLABORATION

TECHNICAL FIELD

The present invention relates to a method, system, and article of manufacture for managing information technology ("IT") devices, and in particular, to management methods and systems using real-time collaboration and instant messaging technology.

BACKGROUND

The latter half of the twentieth century has been witness to a phenomenon known as the information revolution. While the information revolution is a historical development broader in scope than any one event or machine, the decreasing cost of information technology has undoubtedly been revolutionary. These decreases, in turn, have driven productivity increases in a snowballing effect as product designs, manufacturing processes, resource scheduling, administrative chores, and many other factors, are made more efficient. As a result of these benefits, information technology now plays a critical role in virtually every organization.

Many organizations have discovered that the total cost of processing information is not limited to the cost of the hardware and software used to perform the tasks. It also includes the cost of human resources devoted to install and maintain the IT systems and, perhaps more significantly, the lost productivity costs incurred when IT systems fail. As IT systems and their applications have become mission-critical, many organizations now employ teams of skilled IT administrators to manage their IT resources. One problem that these organizations encounter, however, is that it is prohibitively expensive to assign an administrator to monitor every piece of critical equipment 24 hours a day, 365 days a year.

One partial solution to this problem is to have the IT systems send out an email to an administrator should a problem arise. The administrator who receives the email can then diagnose and resolve the problem. One problem with this solution, however, is that that there can be significant delay between the time the administrator receives the email and the time they actually read it, particularly when the triggering condition occurs at night or during holidays. Moreover, even after the administrator reads the email, they may still need to travel to the problem site before they can fix the problem. For many mission-critical applications, even a few minutes of downtime can cause millions of dollars worth of losses.

Another problem with conventional notification systems is that they do not ensure that the proper administrator received the alert and is going to take action to solve the problem. Another problem with conventional systems is that they frequently send the emergency emails to an administrator who is at home or on another service call, even though there are other, available administrators who can respond to the problem as effectively. Yet another problem with email solutions is that they only provide asynchronous communications. Accordingly, there is no real-time feedback possible to the system from the administrator indicating the administrator's ability to do anything about the problem.

Without a means to improve the response to IT problems, the promise of the information technology revolution may never be fully achieved.

SUMMARY OF THE INVENTION

The present invention provides a method of improving the response time to IT problems and ensuring that some will respond to a problem. Accordingly, one aspect of the present invention is a method of responding to a problem condition. One embodiment of this method comprises detecting a first available candidate to respond to a problem condition, and assigning responsibility for the problem condition to the first available candidate. In some embodiments, assigning responsibility for the problem condition comprises sending a real time message to the first available candidate. This method may further comprise waiting for a response from the first available candidate, and if the response is not received within a selected period of time, assigning responsibility for the problem condition to a second available candidate.

Another aspect of the present invention is a method of managing an information technology device, one embodiment of which comprises receiving an alert from a managed information technology device, selecting a candidate qualified to respond to the event, and determining if the candidate is available to respond to the event. These embodiments may further comprise sending an instant message to the candidate containing information about the alert and receiving an instant message from the candidate indicating acceptance of responsibility for the alert.

Another aspect of the present invention is a method for assigning responsibility for responding to a fault condition in an information technology device. One embodiment of this method comprises receiving an alert from a monitored information technology device, the alert describing an event in the monitored information technology device; detecting an available administrator qualified to respond to the event; sending a first instant message to the available administrator, the instant message referencing the alert and requesting an acknowledgement; receiving a second instant message from the available administrator, the second instant message containing the acknowledgement from the administrator; and assigning responsibility for the event to the available administrator.

Other aspects of the present invention include a management system and a computer program product. One embodiment of the management system comprises an agent that detects a condition in a managed device and communicates the condition to a event processing server; a event processing server that selects an available administrator to respond to the condition and communicates the condition to a client device associated with the available administrator; and a client device that communicates the condition to the available administrator. One embodiment of the computer program product comprises a program which, when executed by a processor, performs a method of responding to a problem condition and a signal bearing media bearing the program. The method performed by the program comprises detecting a first available candidate to respond to a problem condition and assigning responsibility for the problem condition to the first available candidate.

The present invention offers numerous advantages over conventional management methods and systems. For example, embodiments of the present invention can selectively send problem alerts those administrators who are at or near their client device, which ensures that the administrators will receive the alert immediately. Embodiments of the present invention can also selectively send the alerts to those administrators who are qualified to respond to the problem. These and other features, aspects, and advantages will become better understood with reference to the following description, appended claims, and accompanying drawings.

BRIEF DESCRIPTION OF THE DRAWINGS

So the manner in which the above recited features of the present invention are attained and can be understood in detail, a more particular description of the invention may be had by reference to the embodiments thereof that are illustrated in the appended drawings.

It is to be noted that these drawings illustrate only typical embodiments of this invention and are therefore not to be considered limiting of its scope, for the invention may admit to other equally effective embodiments.

DETAILED DESCRIPTION

Figure 1A:
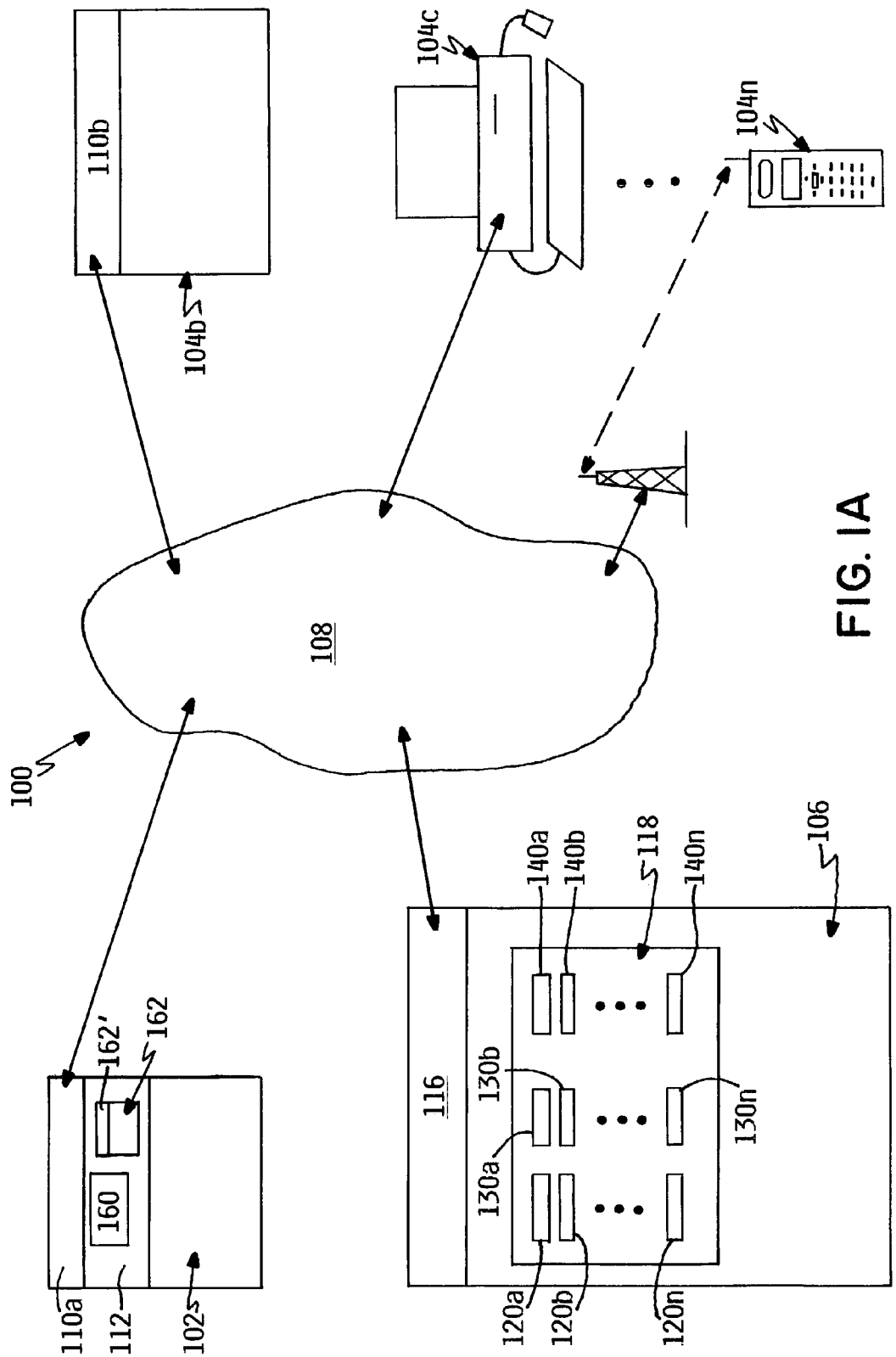
FIG. 1A depicts an IT management system embodiment in accordance with the present invention.

FIG. 1A shows a one embodiment of an IT management system 100. This system 100 comprises a plurality of monitored IT devices 102 (for clarity, only one shown) connected to a plurality of client devices 104b-104n (for clarity, only one shown in detail) and a server computer 106 by an appropriate communications medium 108. Each monitored IT device 102 contains an instant messaging client application 110 ("instant messaging client") and at least one monitoring agent and/or sensor 112 ("monitoring system") that monitors the IT device 102 for events and triggers indicating a problem or fault condition. Each client device 104 is assigned to one of the organization's IT administrators and contains an instant messaging client 110b-110n with online awareness capabilities. The server computer 106 contains an intelligent message server application 116 ("intelligent agent") capable of processing alerts, instant messages, and availability awareness information from the monitored devices 102 and the instant messaging clients 110; and a database application 118 that manages a database containing a plurality of administrator records 120, a plurality of device records 130, and a plurality of alert records 140.

Figure 1B:
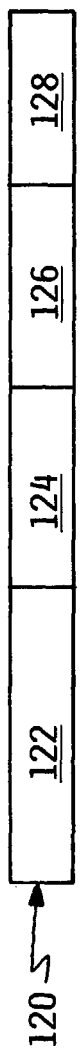
FIG. 1B depicts a data structure for an administrator record.
Figure 1C:
FIG. 1C depicts a data structure for a device record.
Figure 1D:
FIG. 1D depicts a data structure for an alert record.

As best shown in FIG. 1B, each administrator record 120 contains an administrator identifier field 122 containing an electronic identifier, such as an email address, of one of the organization's IT administrators; a nickname field 124 containing the administrator's first and/or last name; a physical location field 126 containing the IT professional's physical location (e.g., a site name or global positioning system coordinates), and a knowledgeable subject matter field 128 containing codes indicating the types of problems to which the administrator is qualified to respond. As best shown in FIG. 1C, each device record 130 contains a unique device identifier field 132 containing the electronic identity of a monitored device 102, and a physical location field 134 containing the physical location of the monitored device 102. As best shown in FIG. 1D, each alert record 140 includes an alert identifier 142, a device identifier 144 containing the device identifier 132 belonging to the device 102 that issued the alert, a responding administrator field 146 containing the electronic identifier 122 associated with the administrator who responded to the alert, a subject matter code 148 for storing a code indicating the type of problem that generated the alert, and an alert description field 149 for storing any comments from the administrator who responded to the alert.

In operation, the management system 100 uses the monitoring system 112 to detect problem conditions with the IT device 102, such as low system availability, high response time, high CPU and/or DASD utilization, unusual system events, system error messages and the like. When such an event occurs, the IT device 102 sends a communication, such as an instant message, containing a description of the alert to the intelligent agent 116. In response, the intelligent agent 116 selects an administrator who is both qualified and available to respond to the alert, and then sends an instant message containing the description of the alert to the selected administrator. The administrator may accept responsibility for the alert by sending an instant message acknowledgement back to the intelligent agent 116. If the intelligent agent 116 does not receive the acknowledgement within a few minutes, it automatically finds another administrator to respond to the alert.

Figure 2:
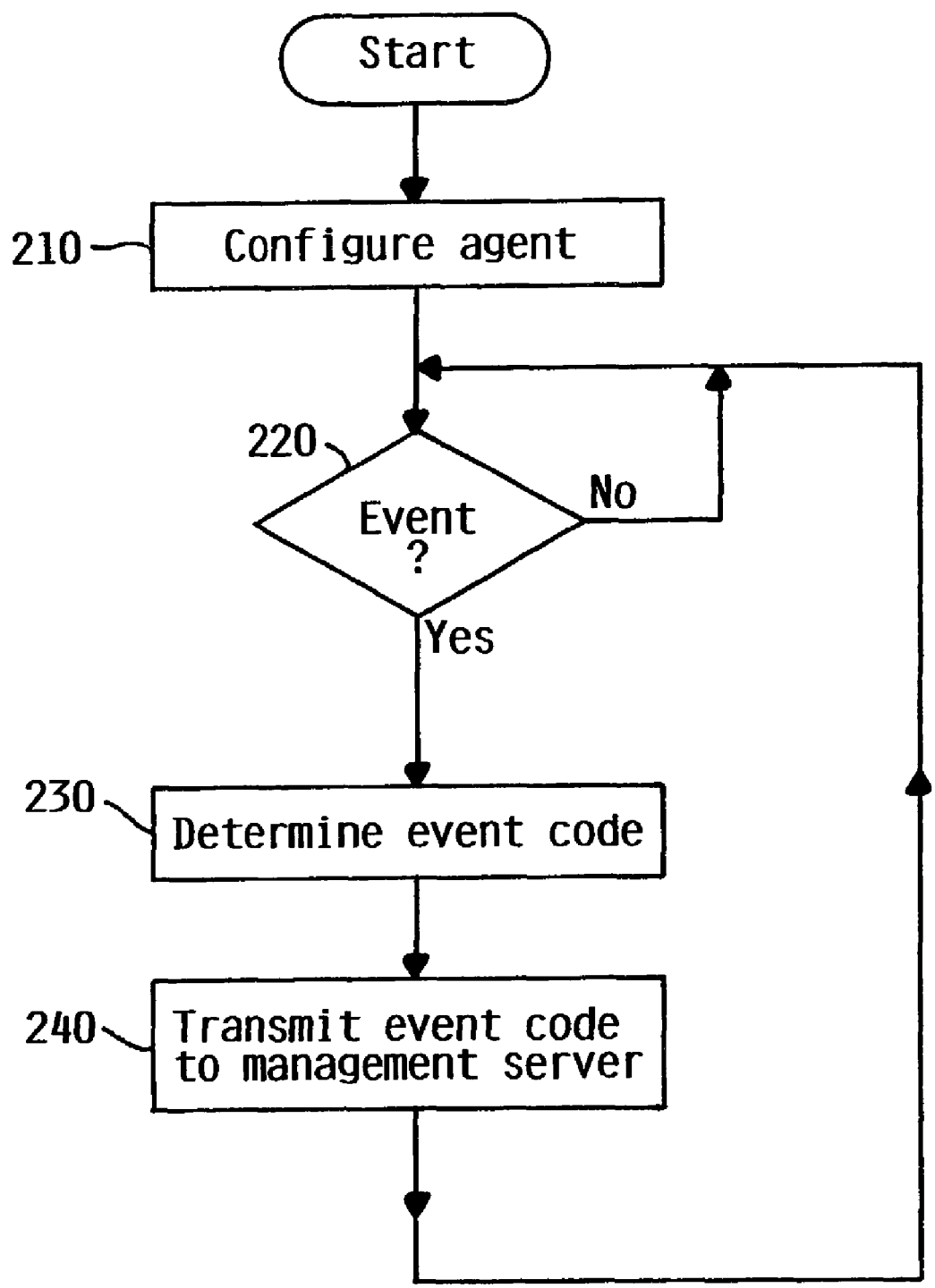
FIG. 2 depicts the operation of an intelligent agent embodiment.

FIG. 2 depicts the operation of the monitoring system 112 in more detail. At block 210, each monitoring system 112 and/or device 102 is assigned a unique device identifier 160 and loaded with a list of alert identifier codes 162 for the types of problems for which it is designed to monitor. For example, if the IT device 102 is a server computer, alert code A001 may indicate that the CPU load is greater than a particular value, alert code A002 may indicate that one of the computer's cooling fans has failed, etc . . . . At block 220, the monitoring system(s) 112 monitors the IT device(s) 102 until one detects an event. When a particular monitoring system 112 detects an event, it determines (at block 230) the appropriate alert code 162' from the list of codes 162. Next, at block 240, the monitoring system 112 transmits the device identifier 160 and the alert code 162' to the intelligent agent 116 using the instant messaging client 110a, or other suitable communication protocol, and then continues to monitor the IT device 102.

Figure 3:
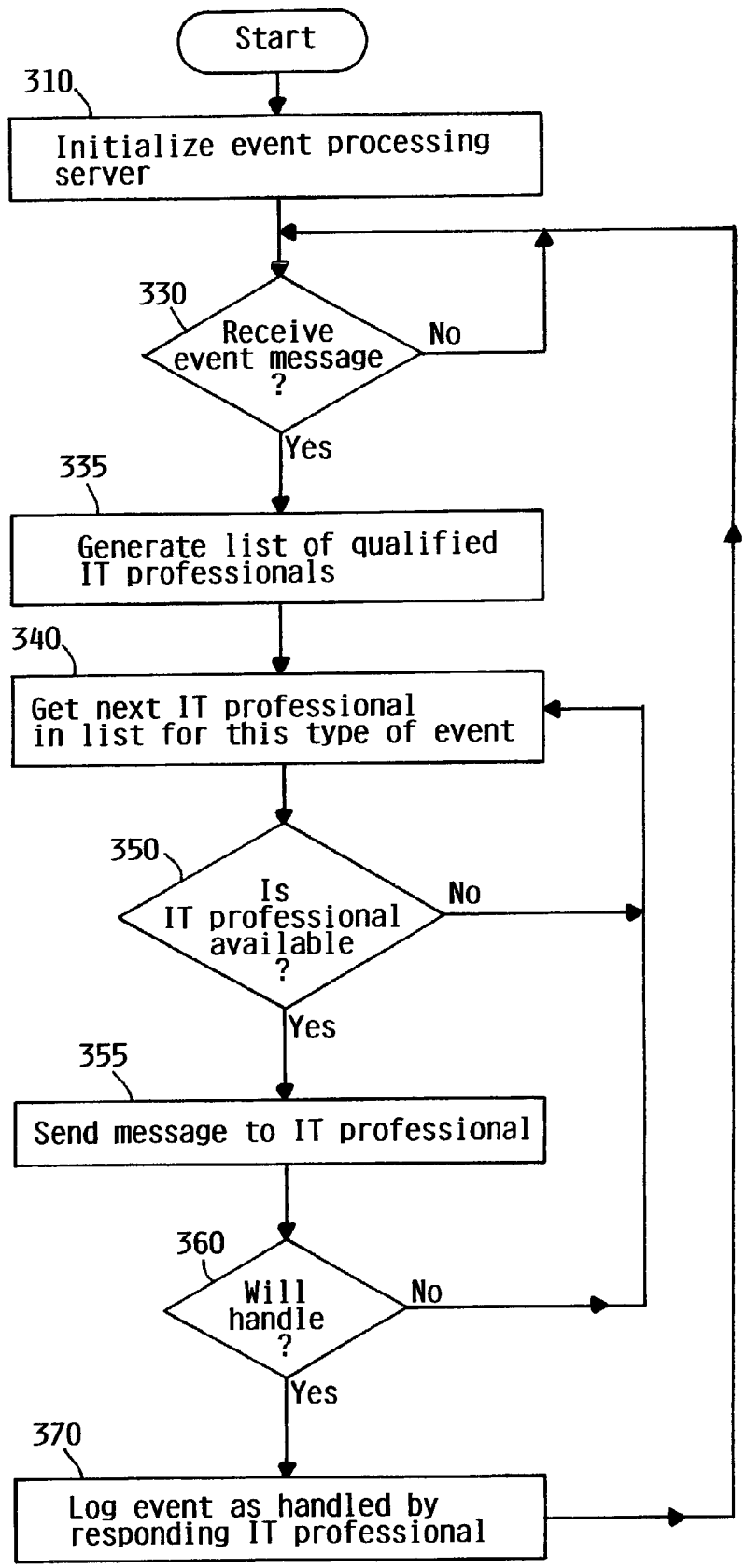
FIG. 3 depicts the operation of an event processing server embodiment.

FIG. 3 depicts the operation of the intelligent agent 116 in more detail. At block 310, the administrator records 120 are initialized with the names, electronic addresses, and locations of each of the organization's IT administrators, together with the alert identifier codes 162 for which the administrator is qualified to respond. In some embodiments, the "administrators" may include mix of human IT professionals and intelligent agents (not shown) capable of responding to various alert codes 162, such as a load-balancing agent that automatically directs traffic away from an overwhelmed device 102 in response to an alert indicating high CPU use. Also at block 310, the device records 130 are initialized with the names, electronic addresses, and locations of each monitored IT device 102. The intelligent agent 116 then waits until it receives an alert from one of the monitored devices 102.

When the intelligent agent 116 receives an alert from a monitored device 102, it searches for an administrator who is both qualified and available to resolve the event that triggered the alert. More specifically, the intelligent agent 116 generates a list of qualified administrators at block 335 by first extracting the alert code 162' from the alert message, then searching the administrator records 120 for an administrator having the same code 162 in their knowledgeable subject matter field 128. Next, at blocks 340-350, the intelligent agent 116 selects the first administrator in the list and determines if that administrator is near their client device 104 so that they will receive the alert message. One suitable way is to use online awareness techniques, such as those used by Lotus Sametime client and the Lotus Sametime Server application, available from International Business Machines of Armonk, N.Y., or those described in U.S. Pat. No. 6,449,344, which is herein incorporated by reference in its entirety.

If the administrator is flagged as available (at block 350), the intelligent agent 116 sends (at block 355) the device identifier 160, a description of the alert generated from the alert code 162', and a request to accept responsibility for the alert to the selected administrator. If the administrator acknowledges receipt of the message and acceptance of responsibility for the alert (at block 360), the intelligent agent 116 logs (at block 370) the professional's electronic address into the responding administrator field 146, the identifier 160 for the device 102 into the device identifier field 144, and the code 162' for the alert into the alert identifier field 149. If the administrator is not available or does not accept the task, the event processing server repeats blocks 340-370 with the next administrator in the list, and process repeats until an administrator accepts responsibility for the alert.

Some embodiments may sort the list generated at block 335 to optimize the order in which they send requests to the qualified administrators. These embodiments may be desirable because they can assign responsibility to the particular administrator who is best able to respond to the alert. For example, the intelligent agent 116 may use the administrator's physical location 126 and the device's physical location 134 to select the administrator who is located closest to the device 102 or who will be closest to the device 102 after completing their current task. These embodiments may be particularly desirable when used with pervasive and/or mobile clients 104*n* capable of detecting its location in near real-time, such as a cellular telephone equipped with a global positioning system ("GPS") receiver 199, because the management system 100 can track the location of the administrator as they move through the organization's facilities. Other embodiments further optimize assignments by using the alert records 140 to assign the alert to the administrator who recently solved a similar problem or who last worked on the device 102 that sent the alert.

Another optimization used by some embodiments is to select the administrators based on the extent to which they are available. In these embodiments, the instant messaging client 110*b* will allow the administrator to enter an 'availability' score between 1 and 5, where '1' indicates that they can respond to any problem; '3' indicates that they are responding to another problem, but can be interrupted if a mission-critical device 102 fails; and '5' indicates that they are already responding to a mission-critical failure. This instant messaging client 110*b* will then transmit this availability score to the intelligent agent 116 as an on-line awareness state. The intelligent agent 116 will use this availability score, the alert code from the monitoring system 112, and the device identifier 132 to prioritize assignments so that critical alerts are resolved quickly. Those skilled in the art will art will appreciate that other optimizations, and various combinations of these optimizations, are also within the scope of the present invention.

Referring again to FIG. 1, the instant messaging clients 110 can be any type of communication device or application capable of facilitating instant messaging among multiple computer users attached to the communications medium 108. The intelligent agent 116, similarly, can be any system capable of working with the database application 118 to send instant messages to the appropriate administrators. Instant messaging may be implemented in various ways, but in general, it supports the sending and receiving of instant messages to and from other users. Instant messages, in turn, are messages which appear on the computer display of the recipient more or less instantly after being sent, subject only to transmission delays, processing delays, and the like, as opposed to more traditional e-mail and pager messages, which typically are logged until the recipient wishes to view them or the device is powered on and connected to the network. Online awareness is the ability of the instant messaging system to know your status, such as being available, away from desk, and the like. Suitable instant messaging clients 110, messaging servers, and database applications 118 are the Lotus Sametime Connect client, the Lotus Sametime Server application, and the IBM DB2 database, all of which are available from International Business Machines of Armonk, N.Y.

In addition, although the embodiment in FIGS. 1A-1B has been described with reference to querying the database application 118, those skilled in the art will appreciate that the intelligent agent 116 may use real-time communication to acquire all or part of this information. For example, the intelligent agent 116 in some embodiments may poll a particular client device 104*n* to determine its location, rather query the database application 118. These embodiments may be desirable because they may require less storage for the database application 118 and may reduce the network traffic associated with maintaining current database records.

The communication medium 108 can be any device or system that allows the IT device 102, the client devices 104, and the intelligent agent 116 to communicate with each other. Suitable communication mediums include, but are not limited to, the Internet, intranets, cellular transmission networks, networks using the IEEE 802.11 specification, and various combinations thereof. Those skilled in the art will appreciate that many different network protocols can be used to implement the communication medium 108. The Transmission Control Protocol/Internet Protocol ("TCP/IP") is an example of a suitable network protocol for Internet communication.

The embodiment described with reference to FIGS. 1-3 uses a client-server network architecture. These embodiments are desirable because the instant messaging clients 110 can utilize the service of the intelligent agent 116 without the devices 102, 104, 106 requiring knowledge of the working details about the other. However, those skilled in the art will appreciate that other network architectures are within the scope of the present invention. Examples of other network architectures include, without limitation, peer-to-peer architectures and three-tier architectures.

The identifier fields 122, 132 may contain any information capable of identifying resources on the communication medium 108. The alert identifier 142, similarly, may contain any information capable of identifying individual alerts. For embodiments using the Internet, the identifier fields 122, 132 may contain an electronic mail address associated with the administrator and the device, respectively. These mail addresses are typically in the form user_name@mail_server_name, where mail_server_name specifies the name of a mail server for the user, and user_name is the name of the user or device known to the intelligent agent server 116. For embodiments utilizing pervasive and/or mobile client devices 104*n* and cellular telephony networks, the identifier fields 122, 132 may contain the telephone number associated with the pervasive and/or mobile client device 104*n*. Suitable information for the alert identifier 142 includes alphanumeric serial number or sender/timestamp information.

The monitoring systems 112 can be any device, system, or computer program capable of detecting problem conditions in the monitored device 102. Suitable monitors 112 include, without limitation, a simple sensor that generates an alert when a variable exceeds a set point, and a complex monitoring program that uses artificial intelligence techniques to anticipate problems before they cause a catastrophic failure. Furthermore, although the monitoring system 112 has been generally described as communicating with the intelligent agent 116 via the instant message client 110*a*, those skilled in the art will appreciate that other communication protocols are within the scope of the present invention. Suitable protocols include, without limitation, the Simple Network Management Protocol ("SNMP"). These embodiments may be desirable because they would not need to include a message client 110.

Figure 4:
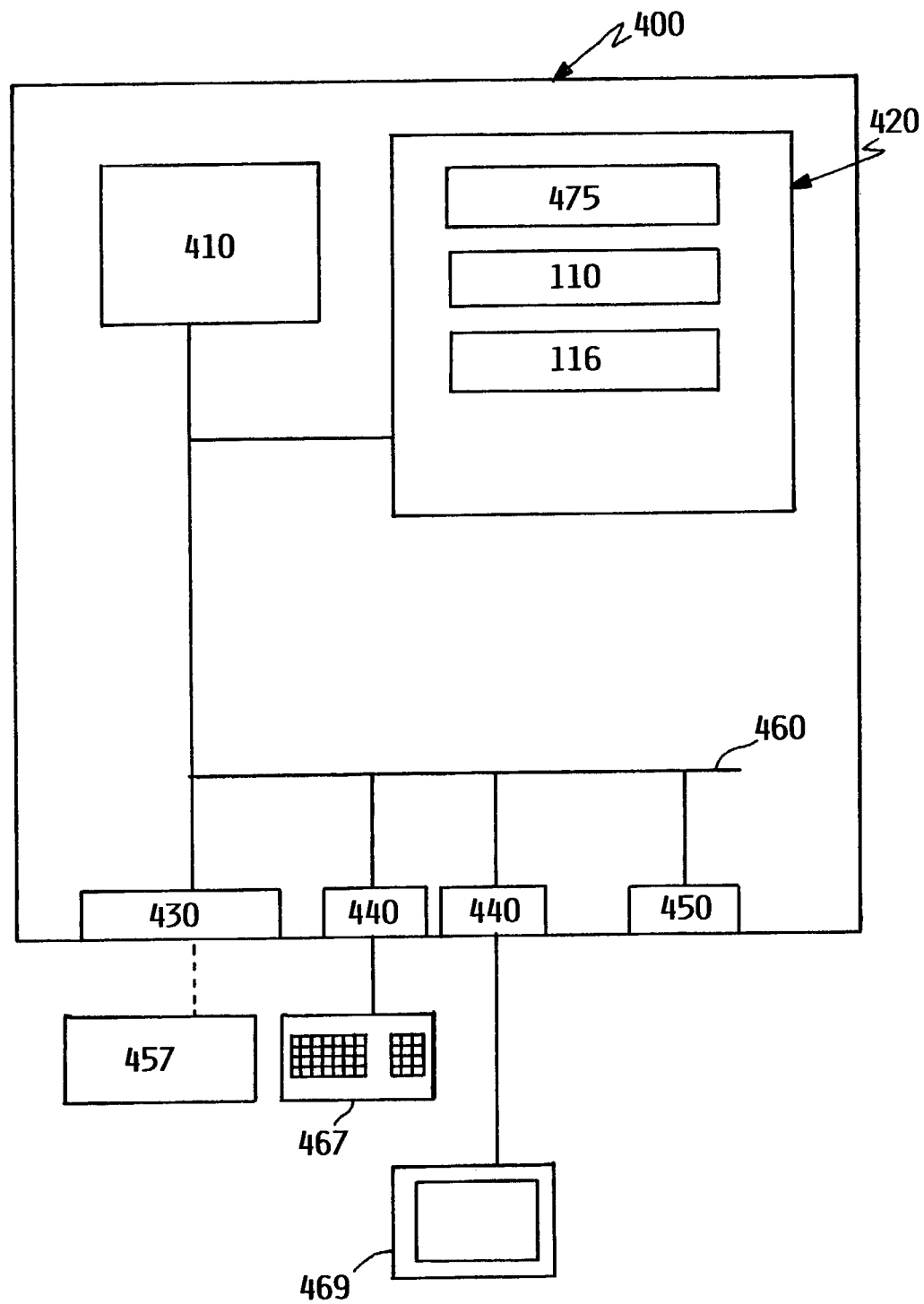
FIG. 4 depicts a computer system suitable for use with the embodiments in FIGS. 1-3.

FIG. 4 depicts a computer 400 embodiment suitable for use as one of the client devices 104 or as the server computer 106. This computer 400 embodiment comprises a processor 410 connected to a main memory 420, a mass storage interface 430, one or more I/O interfaces 440, and a network interface 450 via a system bus 460. The mass storage interface 430 connects one or more mass storage devices, such as a direct access storage device ("DASD") 457, to the system bus 460. The input/output ("I/O") interface 440 connects one or more input/output devices, such as a keyboard 467 or cathode ray tube display 469, to the system bus 460. The network interface 450 connects the computer 400 to the other devices 102, 104, 106 (not shown) over the communication medium 108. The main memory 420 contains one or more application programs, such as an operating system 475, the instant messaging client 110, and/or the intelligent agent 116.

The processor 410 in this embodiment may be any device capable of executing the program instructions stored in the main memories 420; and may be constructed from one or more microprocessors and/or integrated circuits. Furthermore, although the computer system 400 is shown to contain only a single processor 410 and a single system bus 460, those skilled in the art will appreciate that the present invention may be practiced using a computer system that has multiple processors 410 and/or multiple buses 460. In addition, the interfaces 430, 440, 450 may each include their own separate, fully programmed microprocessors that are used to off-load compute-intensive processing from the main processor. 410.

When the computer 400 starts up, the processor 410 initially executes the program instructions that make up the operating system 475, which is a sophisticated program that manages the resources of computer system 400, including: the processors 410; the main memory 420; the mass storage interface 430; the I/O interfaces 440; the network interface 450; and the system buses 460. Administrators may enter commands for the operating system 475 using appropriate I/O devices, such as the keyboard 467 or mouse (not shown), connected to the I/O interfaces 440.

The computer system 400 in this embodiment utilizes well-known virtual addressing mechanisms that allow its programs to behave as if they have access to a large, single storage entity instead of access to multiple, smaller storage entities such as main memories 420 and the DASD device 457. Therefore, while the operating system 475, the instant messaging client 110b, the intelligent agent 116 and their associated data are shown to reside in main memory 420, those skilled in the art will recognize that these items are not necessarily all completely contained in main memory 420 at the same time, and may also reside in the virtual memory of other computer systems (not shown) coupled to the computer system 400.

One suitable server computer 400 is an eServer iSeries® computer running the OS/400® multitasking operating system, both of which are produced by International Business Machines Corporation of Armonk, N.Y. Another suitable client computer 400 is an IBM Thinkpad® computer running the Linux™ operating system, both of which are also available from International Business Machines of Armonk, N.Y. However, those skilled in the art will appreciate that the mechanisms and apparatus of the present invention apply equally to any computer system 400 and operating system 475, regardless of whether the computer system 400 is a complicated multi-user computing apparatus; a single-user workstation; a pervasive device, such as a cellular telephone or personal digital assistant ("PDA"); or an embedded control system.

Although the present invention has been described in detail with reference to certain examples thereof, it may be also embodied in other specific forms without departing from the essential spirit or attributes thereof. For example, those skilled in the art will appreciate that the present invention is capable of being distributed as a program product in a variety of forms, and applies equally regardless of the particular type of signal bearing media used to actually carry out the distribution. Examples of suitable signal bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive, a CD-R disk, a CD-RW disk, or hard-disk drive); or (iii) information conveyed to a computer by a transmission medium, such as through a computer or telephone network, including wireless communications, and specifically includes information downloaded from the Internet and other networks. Such signal-bearing media, when carrying computer-readable instructions that direct the functions of the present invention, represent embodiments of the present invention.

In addition, the management system 100 can be setup to alert a group of administrators all at once and, using the n-way chat features of instant-messaging systems, such as Lotus Sametime. These embodiments may be desirable because they will allow the selected administrators to discuss among themselves who is going to handle the alert or can discuss the cause of the alert. Some instant-messaging systems, such as Lotus Sametime, also offer instant application sharing features that allow the administrators to bring up a shared view of the IT device 102 and work on the problem causing the alert in a team manner.

Those skilled in the art will appreciate that the present invention and its two-way communication system can also allow the administrator to use their instant messaging client 110b to query and pass commands to the monitoring system 112. These embodiments may be desirable because they allow the administrator to perform multiple tasks using a single interface and provide a uniform interface on which to provide additional management functionality.

The present invention offers numerous advantages over conventional IT management techniques. For example, by using the awareness feature of real-time collaboration programs, the management system 100 can send the system alerts only to administrators who are available and qualified to respond. The present invention and its two-way communications also allows the management system 100 to request feedback to ensure the admin received the alert and is going to take action. Another advantage is that the management system 100 can alert different classes or groups of administrators for different problems on the same IT device 102. Thus, for a multifunction server computer, the management system 100 can alert a system administrator when it receives general, system-related problems and an application administrator for a problem with a particular application system. Yet another advantage is that the management system 100 and its database of alert records 140 can provide reports on previous alerts and on which administrator handled the alert.

The accompanying figures and this description depicted and described embodiments of the present invention, and features and components thereof. Those skilled in the art will appreciate that any particular program nomenclature used in this description was merely for convenience, and thus the invention should not be limited to use solely in any specific application identified and/or implied by such nomenclature. Thus, for example, the routines executed to implement the embodiments of the invention, whether implemented as part of an operating system or a specific application, component, program, module, object, or sequence of instructions could have been referred to as a "program", "application", "server", or other meaningful nomenclature. Accordingly, it is desired that the embodiments described herein be considered in all respects as illustrative, not restrictive, and that reference be made to the appended claims for determining the scope of the invention.

We claim:

1. A computer-implemented method of responding to a problem condition, comprising:
    automatically detecting availability of a first candidate to respond to a problem condition;
    responsive to the detecting:
    automatically assigning responsibility for the problem condition to the first candidate; and
    receiving a confirmation from the first candidate indicating acceptance of responsibility for the problem condition.

2. The method of claim 1, wherein assigning responsibility for the problem condition comprises sending a real time message to the first candidate.

3. The method of claim 2, further comprising:
    if the confirmation is not received within a selected period:
    detecting availability of a second candidate; and
    assigning responsibility for the problem condition to the second candidate.

4. The method of claim 1, wherein the availability comprises an online presence in an instant message system.

5. A computer-implemented method of managing an information technology device, comprising:
    receiving an alert from a managed information technology device;
    receiving availability information about a plurality of candidates;
    automatically selecting a candidate qualified and available to respond to the event from among the plurality of candidates;
    automatically assigning responsibility for the alert to the candidate; and
    receiving a reply from the candidate indicating acceptance of responsibility for the alert.

6. The method of claim 5, wherein the selecting comprises using the availability information.

7. The method of claim 5, wherein selecting a candidate comprises:
    determining a plurality of qualified candidates; and
    choosing one candidate from the plurality of qualified candidates.

8. The method of claim 7, further comprising determining which candidate in the plurality of qualified candidates is located closest to the managed device.

9. The method of claim 7, further comprising determining whether a candidate in the plurality of qualified candidates has resolved a similar alert.

10. The method of claim 7, further comprising determining which candidate in the plurality of qualified candidates has worked on the information technology device most recently.

11. The method of claim 7, further comprising determining which candidate is the most available to respond to the alert.

12. The method of claim 7, wherein choosing one candidate from the plurality of qualified candidates comprises selecting an optimal candidate using an availability score of each candidate in the plurality of qualified candidates, a severity of the alert, and a distance between each candidate in the plurality of qualified candidates and the information technology device.

13. The method of claim 5, wherein the information technology device comprises a computer.

14. A computer-implemented method of managing an information technology device, comprising:
    receiving an alert from a managed information technology device;
    automatically selecting a candidate qualified to respond to the event;
    automatically determining if the candidate is available to respond to the event;
    automatically sending an instant message to the candidate containing information about the alert;
    receiving an instant message from the candidate indicating acceptance of responsibility for the alert; and
    automatically assigning responsibility for the alert to the candidate.

15. The method of claim 14, further comprising:
    waiting for an instant message from the candidate indicating acceptance of responsibility for the alert; and
    if the instant message indicating acceptance is not received within a selected period:
    detecting a second candidate qualified to respond to the alert; and
    determining if the second candidate is available to respond to the alert.

16. The method of claim 14, wherein determining if the candidate is available to respond to the event comprises detecting an online presence in an instant message system.

17. A computer-implemented method for assigning responsibility for responding to a fault condition in an information technology device, comprising:
    (a) receiving an alert from a monitored information technology device, the alert describing an event in the monitored information technology device;
    (b) automatically detecting an available administrator qualified to respond to the event; © automatically sending a first instant message to the available administrator, the instant message referencing the alert and requesting an acknowledgement;
    (d) receiving a second instant message from the available administrator, the second instant message containing the acknowledgement from the administrator; and
    (e) automatically assigning responsibility for the event to the available administrator.

* * * * *